United States Patent Office 3,466,333
Patented Sept. 9, 1969

3,466,333
PROCESS FOR PREPARING BETA-DISUBSTITUTED ALPHA-INDANONES
Herman A. Bruson, Woodbridge, and Howard L. Plant, Milford, Conn., assignors to Olin Mathieson Chemical Corporation, a corporation of Virginia
No Drawing. Filed Dec. 10, 1964, Ser. No. 417,507
Int. Cl. C07c 49/76
U.S. Cl. 260—590    10 Claims

ABSTRACT OF THE DISCLOSURE

Process for preparing beta-disubstituted alpha-indanones by reacting carbon monoxide, an aromatic compound such as benzene, and certain aliphatic halides in the presence of an aluminum halide catalyst. Products of the process include 2-methyl-2-phenylindanone-1; 2,2-dimethylindanone-1; 2,2,3,3-tetramethylindanone-1; 2,3-dimethyl-2-phenylindanone-1; and 2-methyl - 2 - (o-chlorophenyl)-4-chloro-indanone-1.

---

This invention relates to beta-disubstituted alpha-indanones, and to a process for preparing beta-disubstituted alpha-indanones.

In the past, such compounds have been prepared by reacting various arylpropionic acids or the corresponding acid chlorides with acidic condensing agents such as hydrogen fluoride, aluminum chloride or phosphoric anhydride to effect a ring closure, as follows:

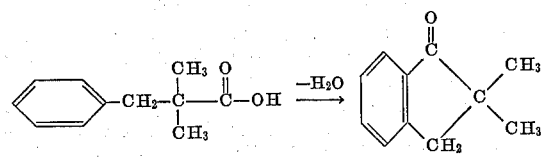

Usually the products have been costly because of the numerous steps involved in preparing the required α,α-disubstituted arylpropionic acids (or the corresponding acid chlorides).

For example, 2-methyl-2-phenylindanone-1, a valuable intermediate for new drugs, was obtained by a costly method in a series of five steps, by Neil Campbell and Englebart Ciganek, Jour. Chem. Soc. (London), 1956, 3834–3836, as shown below:

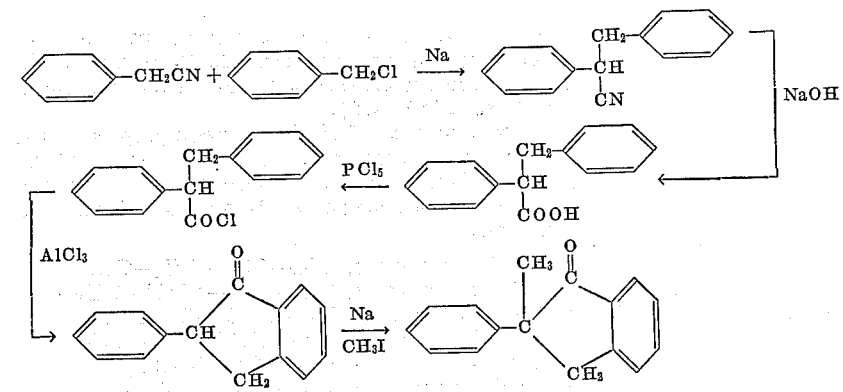

There is a substantial need for a more direct, more economical procedure for preparing beta-disubstituted alpha-indanones.

It is a primary object of this invention to overcome the disadvantages inherent in previously known techniques for preparing beta-disubstituted alpha-indanones.

Another object of the invention is to provide an improved process for preparing beta-disubstituted alpha-indanones.

Still another object of the invention is to provide an improved process for preparing 2 - methyl - 2 - phenyl-indanone-1.

A further object of the invention is to provide novel beta-disubstituted alpha-indanone compositions.

These and other objects of the invention will be apparent from the following detailed description thereof.

It has now been discovered that the foregoing objects are accomplished when certain aliphatic halides, described more fully hereinafter, are reacted with carbon monoxide and an aromatic compound in the presence of an aluminum halide selected from the group consisting of aluminum chloride and aluminum bromide.

More in detail, aliphatic halides suitable for use in preparing beta-disubstituted alpha-indanones in accordance with the novel process of this invention include halogenated alkanes selected from the group consisting of:

1,1,2-trihalogenopropane,
1,2,2-trihalogenopropane,
1,2-dihalogenopropane,
1,2-dihalogeno-2-alkylpropane,
1,2,3-trihalogeno-2-alkylpropane,
1,1,1-trihalogenopropane,
2,2-dihalogenobutane,
1,2-dihalogenobutane,
2,3-dihalogenobutane,
1,3-dihalogenobutane,
2,3-dihalogeno-2,3-dialkylbutane,
2,2,3-trihalogenobutane,
2,3-dihalogeno-2-alkylbutane,
1,2-dihalogeno-2-alkylbutane,
2,2-dihalogeno-3,3-dialkylbutane, halogenated alkenes selected from the group consisting of 3-halogenopropene-1,
1,2-dihalogenopropene-1,
2,3-dihalogenopropene-1,
1-halogenopropene-1,
1-halogeno-2-methylpropene-1,
2-halogeno-3,3-dialkylbutene-1,
3-halogeno-2-alkylpropene-1,
2-halogeno-3-alkylpropene-2,
2-halogeno-3,3,3-trialkylpropene-1,
1,1-dihalogenopropene-1,
2-halogenobutene-1,
2-halogenobutene-2, and mixtures thereof.

In describing the aliphatic halides throughout the description and claims, the halogen substituents referred to include bromine, chlorine, fluorine, iodine and mixtures thereof. The term "alkyl" when used to describe the aliphatic halide throughout the description and claims is intended to signify lower alkyls having one to two carbon atoms, such as methyl or ethyl and mixtures thereof.

The reaction of the aliphatic halide with carbon monoxide and the aromatic compound is carried out in the presence of an aluminum halide selected from the group consisting of aluminum chloride, aluminum bromide and mixtures thereof. The commercially available "anhydrous" material, or these compounds containing small quantities (up to about three percent by weight) of water may be employed. The proportion of aluminum halide is generally in the range between about 1 and about 2 moles per mole of the aliphatic halide, but greater or lesser proportions may be employed if desired. The preferred proportion is in the range between about 1.25 and about 1.6 moles of aluminum halide per mole of the aliphatic halide.

The proportion of carbon monoxide employed in carrying out the process of this invention is generally equivalent to between about one and about five, and preferably between about one and about three moles per mole of aliphatic halide employed as a reactant.

The reaction is carried out in the presence of an aromatic compound having two reactive positions in the aromatic ring which are ortho to each other and available for Friedel-Crafts alkylation and acylation. Suitable aromatic compounds include benzene, halogenated benzenes such as monochlorobenzene, monobromobenzene and monofluorobenzene, alkyl-substituted benzenes such as toluene, o-, m-, or para-xylene, cumene, pseudo-cumene, tertiary butylbenzene, ethylbenzene, diethylbenzene, cycloalkyl-substituted benzenes such as cyclohexylbenzene and mixtures thereof. Other aromatic compounds such as anisole, phenetol, diphenyl ether, diphenylmethane, diphenyl ethane, diphenyl, naphthalene, anthracene, fluorene, phenanthrene are also capable of producing indanones but separation is difficult because of the other reaction products including resins, aldehydes and tar-like materials. The proportion of aromatic compound is generally equivalent to at least one mole of the aromatic compound per atom of halogen in the aliphatic halide, but is preferably between four and about eight times the stoichiometric proportion.

The process of this invention is generally carried out at a temperature in the range of about 0° C. and about 80° C., and preferably between about 15° C. and about 30° C. Atmospheric pressure is generally suitable for effecting the reaction, but super-atmospheric pressures or sub-atmospheric pressures may be employed if desired.

Inert organic solvents such as carbon disulfide may be employed if desired, and are particularly useful when the reaction mixture is highly viscous.

In one embodiment of the invention the aluminum halide is suspended in the aromatic compound, with or without the inert solvent, as the case may be, and a rapid stream of carbon monoxide is passed through the stirred suspension, while simultaneously gradually adding the aliphatic halide to the suspension. The rate of addition of carbon monoxide is generally equivalent to approximately the rate of liberation of hydrogen halide.

If desired, however, the aliphatic halide may be first added to a suspension of the aluminum halide in the aromatic compound or inert solvent, and the resulting aluminum halide complex is then reacted with carbon monoxide to effect a ring closure. Generally the yield of alpha-indanones is lower when employing the latter embodiment than that obtained by the simultaneous addition of carbon monoxide and aliphatic halide to the suspension of aluminum halide.

In order to illustrate the types of reactants that may be employed and the type of reactions that occur, the following equations are presented.

In one embodiment, 2-methyl-2-phenylindanone-1 can be prepared in one step and in high yields by condensing carbon monoxide with 1,2,2-trichloropropane and benzene in the presence of aluminum chloride (Equation A).

(A)

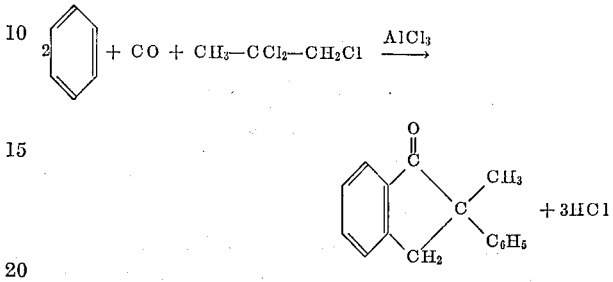

The above reaction occurs rapidly at ordinary room temperature and at atmospheric pressure.

In place of 1,2,2-trichloropropane, one can also use the following organic chlorides to react with benzene, carbon monoxide and aluminum trichloride to obtain 2-methyl-2-phenylindanone-1.

(a) 1,1,2-trichloropropane, $CH_3$—CHCl—$CHCl_2$
(b) 1,2-dichloropropane, $CH_3$—CHCl—$CH_2Cl$
(c) 1,2-dichloropropene-1, $CH_3$—CCl=CHCl
(d) 2,3-dichloropropene-1, $CH_2$=CCl—$CH_2Cl$
(e) 1-chloropropene-1, $CH_3$—CH=CHCl
(f) 3-chloropropene-1, $CH_2$=CH—$CH_2$—Cl The bromine, fluorine or iodine compounds corresponding to 1,2,2-trichloropropane and aliphatic chlorides (a)–(f) wil react in a similar manner.

By utilizing 1,2-dichloro-2-methylpropane in place of the above halides, there is obtained under the same conditions, a good yield of 2,2-dimethylindanone-1 (Equation B).

(B)

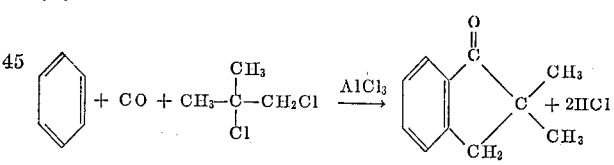

This compound has been made in the past by more cumbersome and expensive methods (Von Awers, Liebig's Annalen der Chemie, 415, 161; Haller and Bauer, Compt. rend., 150, 1475).

In place of the 1,2-dichloro-2-methylpropane above one can also, in accordance with the present invention, use the following organic chlorides to react with benzene, carbon monoxide and $AlCl_3$ to obtain 2,2-dimethylindanone-1.

(g) 2,2-dichlorobutane, $CH_3$—$CCl_2$—$CH_2$—$CH_3$
(h) 1,2-dichlorobutane, $CH_3$—$CH_2$—CHCl—$CH_2Cl$
(i) 2,3-dichlorobutane, $CH_3$—CHCl—CHCl—$CH_3$
(j) 1,3-dichlorobutane, $CH_3$—CHCl—$CH_2$—$CH_2Cl$
(k) 2-chlorobutene-2, $CH_3$—CCl=CH—$CH_3$
(l) 2-chlorobutene-1, $CH_2$=CCl—$CH_2$—$CH_3$
(m) 1-chloro-2-methylpropene-2, $CH_2$=C($CH_3$)$CH_2Cl$
(n) 1-chloro-2-methylpropene-1, $(CH_3)_2$—C=CHCl The bromine, fluorine or iodine compounds corresponding to 1,2-dichloro-2-methyl propane or organic chlorides (g)–(n) will react in a similar manner to yield 2,2-dimethylindanone-1.

By reacting 2,3-dibromo-2,3-dimethylbutane (or the corresponding difluoro-, diiodo or dichloro compound) with benzene and carbon monoxide in the presence of AlCl₃ there is obtained in a similar manner the compound 2,2,3,3-tetramethylindanone-1 (Equation C).

(C)

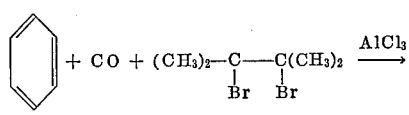

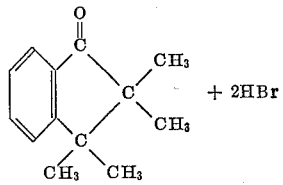

The 2,3-dibromo-2,3-dimethylbutane used above is a readily obtainable crystalline solid prepared by treating the 2,3-dimethylbutane fraction of petroleum distillate with bromine at room temperature in the presence of sunlight, as described by A. V. Grosse and V. N. Ipatieff, Jour. Org. Chem. 8, 440 (1943); and is thus readily accessible. The 2,2,3,3-tetramethylindanone-1 has been previously made from relatively expensive α,α,β-trimethyl-β-phenylbutyric acid. (E. Rothstein, Jour. Chem. Soc. 1951, 1459.)

In place of 2,3-dibromo-2,3-dimethylbutane above, one can also, in accordance with the present invention use 2,2-dichloro-3,3-dimethylbutane or 2-chloro-3,3-dimethyl butene-1 (or the corresponding bromides, iodides or fluorides) to react with benzene, carbon monoxide and AlCl₃ to obtain 2,2,3,3-tetramethylindanone-1, by a molecular rearrangement (Equation D).

(D)

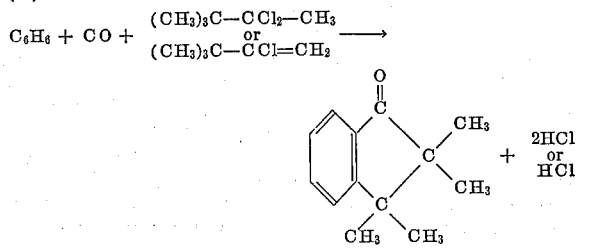

The above chlorides are readily obtained for this purpose by reacting PCl₅ with methyl-tert-butyl ketone (pinacoline).

In a similar manner, benzene and carbon monoxide react in the presence of AlCl₃ or AlBr₃ with certain other specific aliphatic halides as described in more detail further herein, to give other substituted alpha indanones.

For example, 1,2,3-trichloro-2-methylpropane yields the new compound 2,3-dimethyl-2-phenyindanone-1, by a molecular rearrangement (Equation E). It is also obtained from 2,2,3-trichlorobutane without rearrangement (Equation F).

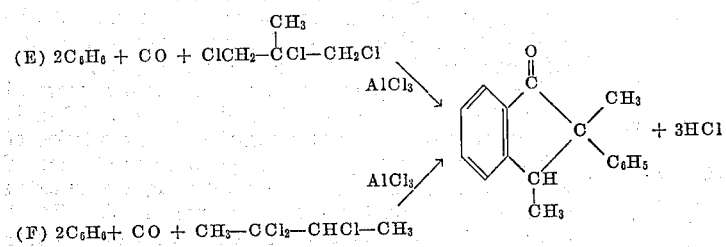

In a similar manner, carbon monoxide reacts with benzene and 2,3-dibromo-2-methylbutane in the presence of AlCl₃ to give the hitherto unknown 2,2,3-trimethylindanone-1 in good yield (Equation G).

(G)

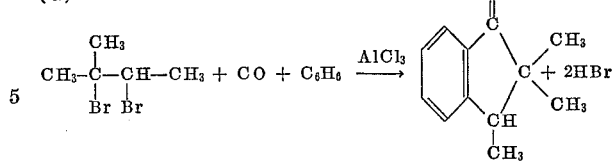

By using 1,2-dibromo-2-methylbutane in the above reaction there is obtained 2-methyl-2-ethylindanone-1 (Equation H).

(H)

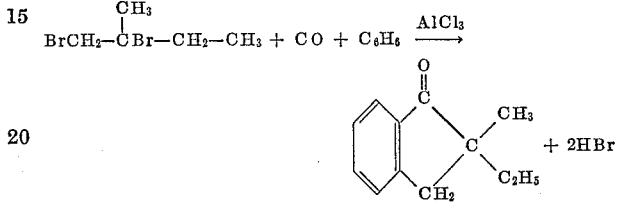

As the chain of the halogenated alkanes used is increased in length beyond four carbon atoms, there are formed by isomerizations and rearrangements mixed isomers of 2,2-dialkylindanones and 2,2-dialkyl tetralones, contaminated with aldehydes which are difficult to purify by distillation alone.

The novel compositions of this invention are represented by the following formula

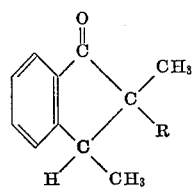

where R is selected from the group consisting of methyl and phenyl. Compounds of this type are useful as intermediates in the preparation of pharmaceuticals such as anti-anxiety medicines and pain-reducing medicines. In addition, liquid compounds of this type prepared from alkyl benzenes have very pleasant odor properties which make them suitable in the preparation of perfumes.

In Equations C–H, the halide substituent of the aliphatic halide can be replaced with any other halide to obtain similar results. Also, all or part of the AlCl₃ can be replaced with AlBr₃ in Equations A–H to obtain the same or similar results.

In all of the reactions of this invention, the substituents of the aliphatic halide are preferably chloride or bromine, for practical and economic reasons.

The following examples are presented to define the invention more fully without any intention of being limited thereby. All parts and percentages are by weight unless otherwise specified.

EXAMPLE 1

2-methyl-2-phenylindanone-1 from 1,2,2-trichloropropane

To a vigorously stirred mixtue of 140 g. benzene (1.8 mol) and 42 g. anhydrous $AlCl_3$ (0.3 mol) in a 1000 cc. creased flask fitted with a reflux condenser, a dropping funnel, and a gas inlet tube extending to the bottom of the flask, there was added dropwise 1,2,2-trichloropropane (44.5 g., 0.3 mol) during a period of three hours. Simultaneously with this addition, carbon monoxide from a cylinder was bubbled rapidly through the stirred mixture by means of the gas inlet tube at a rate of about 130 cc. per minute, and at atmospheric pressure, for a total period of four hours. During this time the temperature of the reaction mixture was maintained at 24–27° C. by a bath of cool water. The HCl evolved was absorbed in water held in a trap at the reflux condenser exit.

The reaction mixture was then poured on to 500 gms. of crushed ice, agitated, and the layers separated. The organic layer contained a considerable amount of finely suspended crystalline material which was filtered off and washed with water. This material was recrystallized from a minimum quantity of hot ethanol and yielded 14.5 g. of pure 2-methyl-2-phenylindanone-1, M.P. 110.5–111° C. The benzene filtrate was washed with two 100 cc. portions of water, dried over anhydrous sodium sulfate and distilled, first at atmospheric pressure to recover the excess benzene, and finally fractionally distilled in vacuum at 0.2 mm. pressure. The crude 2-methyl-2-phenylindanone-1 (48.6 g.) distilled over between 125° and 180° C./0.2 mm. and solidified in the receiver. Upon recrystallization from hot ethanol this gave 39 g. of pure 2-methyl-2-phenylindanone-1, M.P. 111° C. Total yield was 58.5 percent of theory based upon 1,2,2-trichloropropane.

The 1,2,2-trichloropropane used is made by chlorinating propylene dichloride in the presence of free radical-producing catalysts such as $PCl_5$, $SO_2Cl_2$ or ultraviolet light at 80–110° C.

EXAMPLE 2

2-methyl-2-phenylindanone-1 from 1,1,2-trichloropropane

The apparatus and method of operation was the same as in Example 1.

64 g. of 1,1,2-trichloropropane was added dropwise to a vigorously stirred mixture of 70 g. (0.5 mol) $AlCl_3$ and 234 g. benzene (3.0 mol), maintained at 24–26° C. while carbon monoxide was rapidly bubbled through the mixture for the entire three-hour reaction period. The product was worked up by decomposing with ice, washing, drying and distilling the product. The fraction boiling at 145°–165° C./0.1 mm. (29.5 g.) solidified, and upon recrystallization from methanol gave 17.7 g. (19.6 percent of theory) of pure 2-methyl-2-phenylidanone-1, melting at 110–111° C.

EXAMPLE 3

2-methyl-2-phenylindanone-1 from propylene dichloride or dibromide (a) The apparatus and method of operation was the same as in Example 1.

1,2-dichloropropane (57 g., 0.5 mol) diluted with 85 g. of benzene was added dropwise over a period of seven hours to a vigorously agitated mixture of 70 g. (0.5 mol) of $AlCl_3$ and 149 g. benzene at 25–27° C. Carbon monoxide was bubbled in continuously at a rate of 130 cc. per minute at atmospheric pressure during the addition, and for a period of thirty minutes thereafter. The reaction product was poured on to 500 g. chipped ice, the benzene layer washed with water, dried over $Na_2SO_4$, and distilled. The fraction boiling at 125–170° C./0.1 mm. (47.3 g.) partially solidified. Upon washing with cold petroleum ether, 20 g. of white crystalline 2-methyl-2-phenylindanone-1 was obtained (18 percent yield), M.P. 109–110° C.

(b) By using 156 g. of benzene (2 mol), 51 g. of 1,2-dibromopropane (0.25 mol), 35 g. $AlCl_3$ (0.25 mol), and passing in CO over a period of 4½ hours while dropwise adding the 1,2-dibromopropane to the stirred mixture of benzene and $AlCl_3$ at 17–21° C. and working up by washing with petroleum ether as described in (a) above, there was obtained 9.2 g. of 2-methyl-2-phenylindanone (17 percent yield) melting at 109–110° C.

EXAMPLE 4

2-methyl-2-phenylindanone-1 from 1,2-dichloropropene-1

1,2-dichloropropene-1 (56 g., 0.5 mol) was added dropwise over a period of 3½ hours to a vigorously stirred mixture of 70 g. (0.5 mol) of $AlCl_3$ in 234 g. (3.0 mol) of benzene through which was passed a continuous stream of carbon monoxide (130 cc./min.) for a total period of five hours at a reaction temperature of 25–27° C. The mixture was then poured on to 500 g. of crushed ice, and the benzene layer separated, washed with water, dried over $Na_2SO_4$ and distilled. The fraction boiling between 125 and 178° C./0.3 mm. (54.8 g.) solidified in the receiver. This material upon recrystallization from 150 cc. of hot methanol gave 30.8 g. of 2-methyl-2-phenylindanone (29.4 percent yield) M.P. 109–111° C.

The mother liquor from this crystallization upon cooling to 0° C. yielded 10 g. of white crystals, M.P. 39–43° C. which upon further purification by repeated recrystallization from methanol melted at 48–49° C. and was found by infrared, and nuclear magnetic resonance analysis to be 1,1-diphenylpropene-1 $(C_6H_5)_2C$=CH—$CH_3$.

EXAMPLE 5

2-methyl-2-phenylindanone-1 from 2,3-dichloropropene-1

To a stirred mixture of 234 g. (3.0 mol) of benzene and 70 g. (0.5 mol) of $AlCl_3$ there was added dropwise and over a period of 1⅔ hours, 56 g. (0.5 mol) of 2,3-dichloropropene-1, while CO was passed continuously into the mixture at a rate of 100 cc. per minute for the entire reaction period of four hours at 22–26° C. The product was then decomposed with ice water, the layers separated, and the organic phase washed with water, then dried over anhydrous sodium sulfate and fractionally distilled in vacuum. The crude product, boiling at 122–197° C. at 0.2 mm. mercury pressure, weighed 81.6 g. and solidified on standing. Recrystallization from ethyl alcohol gace 40.7 g. of pure 2-methyl-2-phenylindanone-1, M.P. 110.5° C., yield 38 percent of theory.

EXAMPLE 6

2-methyl-2-phenylindanone-1 from 1-chloropropene-1

1-chloropropene-1 (39 g., 0.5 mol) was added dropwise to a stirred mixture of 234 g. (3 mol) benzene and 70 g. $AlCl_3$, while simultaneously passing carbon monoxide rapidly through the mixture over a period of three hours and maintaining the reaction temperature at 24–28° C. Work up of the product as described in Example 3a, by washing with cold petroleum ether gave 2-methyl-2-phenylindanone-1 in 10 percent of the theoretical yield.

The 1-chloropropene-1 used above was a mixture of cis and trans isomers obtained by adding 113 g. (1.0 mol) of propylene dichloride to a stirred refluxing solution of 112 g. (2.0 mol) of potassium hydroxide in 400 ml. of ethyl alcohol, and fractionally distilling the reaction product; collecting the product boiling at 32°–37° C. (760 mm.) as described by Huntress "Organic Chlorine Compounds," page 948.

EXAMPLE 7

2-methyl-2-phenylindanone-1 from 3-chloropropene-1 (allyl chloride)

Allyl chloride (38 g., 0.5 mol) was slowly added dropwise to a stirred mixture of 234 g. (3.0 mol) of benzene and 70 g. (0.5 mol) of AlCl₃ at 20–25° C., while carbon monoxide was bubbled through the mixture over a period of 4½ hours (32.4 liters CO used). The reaction mixture was poured on to 500 cc. of crushed ice, the layers separated, the benzene layer washed with water, dried over anhydrous Na₂SO₄ and distilled at atmospheric pressure to recover the excess benzene. The residual oil was distilled under vacuum and the fraction coming over between 125° and 190° C. at 0.2 mm. was collected (34.4 g.). Upon cooling and scratching this distillate the product partially crystallized. It gave 10.2 g. of pure 2-methyl-2-phenyl-indanone-1 (10 percent yield) upon recrystallization from ethanol.

EXAMPLE 8

2,2-dimethylindanone-1 from 1,2-dichloro-2-methylpropane 64 g. (0.5 mol) of 1,2-dichloro-2-methylpropane was added dropwise to a vigorously agitated mixture of 70 g. (0.5 mol) AlCl₃ in 234 g. (3.0 mol) benzene through which a continuous stream of carbon monoxide (120 cc./min.) was bubbled. The temperature was maintained at 24–27° C. throughout the 4½ hour reaction period. The mixture was poured on to 500 g. of crushed ice, agitated, and the layers separated. After washing the organic layer with water and drying over Na₂SO₄, the product was distilled, first at atmospheric pressure to remove the benzene, and finally under reduced pressure. The fraction boiling at 70–87° C./0.2 mm. (66.7 g.) solidified on standing. Upon crystallization from low boiling petroleum ether at 0° C., there was obtained 59.5 g. (74.5 percent of theory) of 2,2-dimethylindanone-1, M.P. 42–44° C. Upon further recrystallization the pure product melted at 44–45° C.

EXAMPLE 9

2,2-dimethylindanone-1 from 2,2-dichlorobutane 45 g. (0.35 mol) of 2,2-dichlorobutane was added dropwise over a period of 3½ hours to a vigorously agitated mixture of 49 g. (0.35 mol) AlCl₃ and 164 g. (2.1 mol) benzene maintained at 23–26° C. while a rapid stream of carbon monoxide was simultaneously bubbled through the solution during the addition period, and for 1¼ hours thereafter. The reaction mixture was poured on to crushed ice (400 g.), agitated, the benzene layer separated, washed with water, dried over Na₂SO₄ and distilled; eventually under reduced pressure.

The fraction boiling at 85–105°/0.3–0.4 mm. (39.4 g.) solidified in the receiver. Crude yield 70 percent. Upon recrystallization from ligroin at 0° this gave 35.7 g. (63.5 percent yield) of pure 2,2-dimethylindanone-1, M.P. 44° C.

EXAMPLE 10

2,2-dimethylindanone-1 from 1,2-dichlorobutane 51 g. (0.4 mol) of 1,2-dichlorobutane was added dropwise over a period of two hours to a vigorously agitated mixture of 55 g. (0.4 mol) AlCl₃ and 234 g. (3.0 mol) benzene, while CO was bubbled simultaneously through the mixture at a rate of 125 cc./min. for the entire reaction period of 4¼ hours. The reaction temperature was maintained at 23–26° C. by means of a water bath. The mixture was poured on to 500 cc. of crushed ice, agitated, and the benzene layer washed with water, dried over Na₂SO₄ and finally distilled. The 2,2-dimethylindanone-1 distilled over at 75–87° C./0.2–0.3 mm. in a crude yield of 46.3 g. After recrystallization from ligroin at 0°, this gave 38.8 g. of pure product (61 percent yield) M.P. 42–43° C.

A higher boiling fraction, B.P. 87–157° C./0.2 mm. (8.8 g.) yielded 2.4 g. of ligroin-insoluble crystalline material, which after three recrystallizations from methanol gave 1.6 g. of white platelets, M.P. 90–91° C. This was identified as 2,3-dimethyl-2-phenylindanone-1, the preparation of which as a main product is described in Examples 17 and 18 hereunder.

EXAMPLE 11

2,2-dimethylindanone-1 from 2,3-dichlorobutane (a) 38 g. (0.3 mol) of 2,3-dichlorobutane was added dropwise over a period of three hours to a vigorously agitated mixture of 42 g. (0.3 mol) AlCl₃ in 140 g. (1.8 mol) benzene maintained at 23–25° C., while carbon monoxide was rapidly bubbled into the mixture during 3¾ hours. The solution was poured on to 400 cc. of crushed ice, agitated, the organic layer separated and distilled, first at ordinary pressure to remove the benzene and finally under reduced pressure.

The fraction distilling at 75–92° C./0.1 mm. (37.7 g.) solidified on cooling. Upon recrystallization from petroleum ether 33.4 g. (69.5 percent of theory) of 2,2-dimethylindanone-1, M.P. 42–43° C., was obtained.

(b) 54 g. (0.25 mol) of 2,3-dibromobutane was added dropwise over a period of three hours to a vigorously stirred mixture of 35 g. (0.25 mol) AlCl₃ and 234 g. benzene (3.0 mol), maintained at 20–25° C. while simultaneously bubbling in carbon monoxide rapidly for 3½ hours. The mixture was hydrolyzed and worked up as in (a) above to yield 27.4 g. of crude 2,2-dimethylindanone-1 boiling at 70–84° C./0.1 mm. which crystallized on standing. Recrystallization from petroleum ether (B.P. 30–60° C.) at 0° C. three times, yielded the purified product, M.P. 43° C. in 55 percent yield.

EXAMPLE 12

2,2-dimethylindanone-1 from 1,3-dichlorobutane 42 g. (0.33 mol) of 1,3-dichlorobutane was reacted with 46 g. (0.33 mol) AlCl₃, 195 g. (2.5 mol) benzene and carbon monoxide as described in Example 11. Upon distillation there was obtained 16.4 g. crude product boiling at 71–100° C./0.1–0.2 mm. Upon recrystallization from ligroin (B.P. 30–60° C.) at 0° C. this gave 15.5 g. 2,2-dimethylindanone-1 M.P. 41–43° C.

EXAMPLE 13

2,2-dimethylindanone-1 from 2-chlorobutene-2 and -1

45.3 g. (0.5 mol) of 2-chlorobutene-2 and 1 was added dropwise over a period of 3¼ hours to a vigorously agitated mixture of 70 g. (0.5 mol) AlCl₃ and 234 g. (3.0 mol) benzene maintained at 24–26° C. while simultaneously bubbling a rapid stream of CO into the mixture, and for 1¼ hours after the addition of the chlorobutenes. The reaction mixture was decomposed with ice water, and the organic layer washed, dried, and distilled. The fraction boiling at 80–97° C./0.1–0.2 mm. (50.6 g.) solidified on standing, and gave 38.8 g. (48.5 percent of theory) pure 2,2-dimethylindanone-1, M.P. 44° C. upon recrystallization from ligroin at 0° C.

The 2-chlorobutene-2 and -1 used above was prepared by reacting methyl ethyl ketone with PCl₅ as described in Huntress "Organic Chlorine Compounds," page 981, and boiled at 60–64° C. It contained both cis and trans isomers, as well as the double bond in the -2 and -1 positions.

EXAMPLE 14

2,2-dimethylindanone-1 from 3-chloro-2-methylpropene-1 (methallyl chloride)

46 g. (0.5 mol) of methallyl chloride was added dropwise over a period of three hours to a vigorously stirred mixture of 105 g. (0.75 mol) AlCl₃ and 234 g. (3.0 mol) benzene at 24–26° C., while carbon monoxide was bubbled in continuously at a rate of 110–120 cc./min. during the addition and for a period of two hours thereafter. After working up by hydrolysis, washing, drying and distillation under reduced pressure as described above, 43.3 g. of crude crystalline product boiling at 58–92° C. (0.1–0.3 mm.) was obtained; which after recrystallization from petroleum ether at 0° gave 35 g. (44 percent of theory) of pure 2,2-dimethylindanone-1.

EXAMPLE 15

2,2-dimethylindanone-1 from 1-chloro-2-methylpropene-1 ("isocrotyl chloride")

45 g. (0.5 mol) of isocrotyl chloride was added dropwise to a vigorously stirred mixture of 67 g. (0.5 mol) AlCl$_3$ and 234 g. (3.0 mol) benzene maintained at 21–24° C. by a cooling bath, while carbon monoxide was simultnaeously bubbled through the mixture at a rapid rate over a period of 4½ hours total reaction time. Reaction was very exothermic. The mixture was poured on to 500 g. crushed ice, agitated, the benzene layer separated, washed with water, dried over Na$_2$SO$_4$ and fractionally distilled under reduced pressure, after removal of the benzene by evaporation. The fraction boiling at 70–85° C./0.1–0.2 mm. (54.5 g.) solidified on standing. Crude yield 68 percent of theory. Upon recrystallization from ligroin (B.P. 60–90° C.) and chilling to 0° C. 52 g. of pure 2,2-dimethylindanone-1, M.P. 42–43° C., was obtained.

EXAMPLE 16

2,2,3,3-tetramethyl-indanone-1

2,3-dibromo-2,3-dimethylbutane (61 g., 0.25 mol) dissolved in 150 cc. of warm benzene was added dropwise over a period of 3¼ hours to a vigorously agitated mixture of 35 g. (0.25 mol) AlCl$_3$ in 100 g. (1.25 mol) of benzene at 25–27° C. while carbon monoxide was rapidly bubbled continuously in the mixture over a period of four hours. The clear amber-colored solution was poured on to 400 cc. of crushed ice, agitated, and the layers separated. The organic layer was washed with 100 cc. of water, and dried over Na$_2$SO$_4$. The benzene was distilled off and the residual oil fractionally distilled under reduced pressure. The yield of crude product boiling at 80–105° C./0.2 mm. was 34.6 g., $n_D^{21}$ 1.5354. Upon refractionation, 29.8 g. of pure 2,2,3,3-tetramethyl-indanone-1 boiling at 114–115° C./6 mm.; $n_D^{21}$ 1.5356, was obtained (63 percent theory).

EXAMPLE 17

2,3-dimethyl-2-phenylindanone-1 from 1,2,3-trichloro-2-methylpropane 81 g. (0.5 mol) of 1,2,3-trichloro-2-methylpropane was added dropwise to a rapidly agitated slurry of 70 g. (0.5 mol) AlCl$_3$ in 234 g. (3.0 mol) benzene at 21–23° C. during a period of four hours while a rapid stream of carbon monoxide was continuously bubbled through the mixture for 4¾ hours. The resulting solution was poured on to 500 cc. of crushed ice, stirred, and the layers separated. The washed and dried benzene layer was distilled to recover excess benzene and the residual oil was fractionally distilled at reduced pressure. The fraction boiling at 150–186° C./0.4 mm. (63 g.) was an oil which upon rubbing and treatment with a little petroleum ether crystallized. After repeated recrystallizations from boiling methanol, 18.5 g. (15.7 percent yield) of pure product M.P. 90° C. was obtained, the analysis of which together with infrared and nuclear magnetic resonance spectroscopy indicated its formula to be:

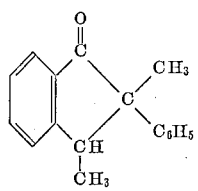

Analysis.—Calcd. for C$_{17}$H$_{16}$O: C, 86.5; H, 6.8. Found: C, 86.45; H, 7.04.

EXAMPLE 18

2,3-dimethyl-2-phenylindanone-1 from 2,2,3-trichlorobutane (a) 2,2,3-trichlorobutane (33.7 g., 0.2 mol) was added dropwise over a period of two hours to a rapidly agitated mixture of 28 g. (0.2 mol) AlCl$_3$ in 95 g. (1.2 mol) of benzene maintained at 22–25° C. while carbon monoxide was rapidly bubbled into the solution continuously for three hours. The reaction mixture was poured on to 400 cc. of crushed ice, the layers separated, the organic layer washed with 100 cc. of water, dried over Na$_2$SO$_4$ and distilled in vacuum.

The fraction boiling at 120–182° C./0.3 mm. (34.8 g.) solidified in the receiver. Upon recrystallization from hot methanol it gave 17.5 g. (39 percent of theory) of pure 2,3-dimethyl-2-phenylindanone-1, M.P. 90° C.

(b) 103 g. (0.4 mol) of 1,2-dibromo-3-chloro-2-methylpropane was added dropwise over a period of four hours to a vigorously stirred mixture of 56 g. (0.4 mol) AlCl$_3$ and 187 g. (2.4 mol) benzene maintained at 22–24° C. while simultaneously passing in carbon monoxide at a rapid rate throughout a 4¾ hour total reaction period. The product after hydrolysis, washing, drying and vacuum distillation gave a fraction boiling at 170–185° C./0.1 mm. (33.9 g.) which solidified in the receiver. Upon washing with cold ligroin and recrystallization from methanol, pure 2,3-dimethyl-2-phenylindanone-1 (14.1 g.) was obtained, M.P. 90–91° C. The musk-like odor of this composition demonstrated its use as a component of perfume.

The 1,2-dibromo-3-chloro-2-methylpropane used above was prepared by adding 160 g. of bromine (1 mol) dropwise to 110.5 g. (1.2 mol) of methallyl chloride in 150 cc. of diethyl ether while stirring and maintaining the reaction temperature at 5–10° C. The pure product (122 g.) boiled at 74–76° C./6 mm. ($n_D^{23}$ 1.5368). Yield=49 percent.

EXAMPLE 19

2,2,3-trimethylindanone-1 from 2,3-dibromo-2-methylbutane 54 g. (0.23 mol) of 2,3-dibromo-2-methylbutane was added dropwise over a period of 4 hours to a vigorously stirred mixture of 33 g. (0.23 mol) of AlCl$_3$ in 110 g. (1.4 mol) of benzene maintained at 23–24° C., while simultaneously bubbling carbon monoxide rapidly through the reaction mixture for a period of 4¾ hours. The solution obtained was poured onto 300 cc. of crushed ice, the layers separated, the organic layer washed with 100 cc. of water, dried over Na$_2$SO$_4$ and distilled. After removal of the benzene, the residual oil was fractionally distilled in vacuum. The following cuts were made:

(I) B.P. 64–90° C./0.4 mm., 5.4 g., $n_D^{22}$=1.5292
(II) B.P. 90–100° C./0.4 mm., 6.3 g., $n_D^{22}$=1.5378
(III) B.P. 100–110° C./0.4 mm., 25.0 g., $n_D^{22}$=1.5393

Fractions II and III were combined and redistilled to yield 24.3 g. (60 percent of theory) of 2,2,3-trimethylindanone-1, having the following structural formula:

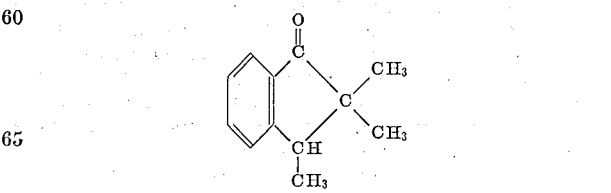

It is a colorless liquid, boiling at 87–89° C./0.6 mm., $n_D^{22}$ 1.5383.

Analysis.—Calcd. for C$_{12}$H$_{14}$O: C, 82.76%; H, 8.05%. Found: C, 83.05%; H, 8.01%.

Its 2,4-dinitrophenylhydrazone derivative melted at 243–244° C.

The 2,3-dibromo-2-methylbutane, B.P. 50–53° C./11 mm. $n_D^{22}$=1.5099, which was used above, was prepared by adding 80 g. of bromine dropwise to stirred, cooled 2-methylbutene-2 (49 g.) in 150 cc. of carbon tetrachloride at −10 to −15° C.

EXAMPLE 20

2,2,3,3-tetramethylindanone-1 from 3,3-dichloro-2,2-dimethylbutane (a) The 3,3-dichloro-2,2-dimethylbutane

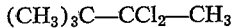

used was prepared by reacting methyl tert-butyl ketone with $PCl_5$ as described by Bartlett and Rosen, Jour. Amer. Chem. Soc. 64, 544 (1942).

62 g. (0.4 mol) of 3,3-dichloro-2,2-dimethylbutane in 88 g. of benzene was added dropwise over a period of four hours to a vigorously stirred mixture of 54 g. (0.4 mol) $AlCl_3$ in 100 g. benzene maintained at 26–28° C. while simultaneously bubbling in carbon monoxide rapidly throughout the entire 4¾ hour reaction period. The product was decomposed with ice and the benzene layer separated, washed and distilled eventually under reduced pressure.

The fraction boiling at 118–121° C./6.5 mm. (23.1 g.) was identified as 2,2,3,3-tetramethyl indanone-1

$$(n_D^{25}=1.5340)$$

Its oxime melted at 140° C.

(b) By reacting 60 g. (0.5 mol) of 2-chloro-3,3-dimethylbutene-1 with 234 g. benzene (3.0 mol) and 70 g. $AlCl_3$ with CO as described in (a) above there was obtained 38 g. of 2,2,3,3-tetramethylindanone-1. Yield 40.5 percent of theory. The 2-chloro-3,3-dimethylbutene-1 used, was prepared by reacting $PCl_5$ with methyl tert-butyl ketone.

EXAMPLE 21

2-methyl-2-(o-chlorophenyl)-4-chloro-indanone-1 from 2,3-dichloropropene-1

56 g. (0.5 mol) of 2,3-dichloropropene-1 was added dropwise and with vigorous stirring to a mixture of 337.5 g. (3.0 mol) of monochlorobenzene and 70 g. (0.5 mol) $AlCl_3$ through which a rapid, continuous stream (110–120 ml./min.) of carbon monoxide was bubbled. The reaction temperature was maintained at 24–26° C. by cooling during the 4½ hour reaction period. The product was decomposed with 500 cc. of crushed ice, the oil layer separated, washed with water, dried over $Na_2SO_4$ and distilled under reduced pressure. The fraction boiling at 165–205° C./0.2 mm. (70.9 g.) was carefully redistilled and the fraction boiling at 163–165° C./0.15 mm. (19 g.) $n_D^{23}$ 1.6180 collected. It gradually crystallized. Upon recrystallization from methanol it formed white crystals melting at 96–97° C. Yield 5.9 g. The still pot residue from the distillation (20 g.) was taken up in 100 cc. of warm ligroin, cooled to 0° C. and the gummy solid washed with cold ligroin until most of the gummy impurity was removed. Upon recrystallization from 75 cc. of boiling methanol this yielded 3.5 g. of white platelets, M.P. 94–96° C., identical in composition with the distilled product. Elemental analysis, infrared, and nuclear magnetic resonance spectrum indicated its most probable composition to be:

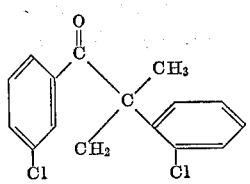

EXAMPLE 22

A solution of 34 g. (0.219 mol) 2,2 - dichloro - 3,3-dimethyl butane dissolved in 63 g. chlorobenzene was added dropwise over a period of 2½ hours to a vigorously stirred mixture of 30 g. (0.22 mol) $AlCl_3$ in 100 g. of chlorobenzene maintained at 23–25° C., while bubbling a rapid stream of carbon monoxide through the mixture for a period of 3½ hours. The reaction mixture was poured on to 300 cc. of crushed ice, the oil layer separated, washed, dried over $Na_2SO_4$ and distilled under reduced pressure. The crude liquid distillate boiling at 118°–142° C./4.2 mm. (20.5 g.) was fractionally redistilled to give the pure product boiling at 140–142° C./4.2 mm. as a colorless liquid, $n_D^{25}=1.5447$, having the formula

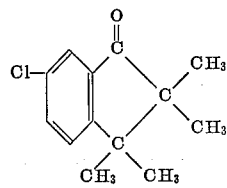

as determined by elemental analysis and nuclear magnetic resonance measurements. Its 2,4-dinitrophenylhydrazone derivative melted at 188–189° C.

EXAMPLE 23

After-treatment with CO of Friedel-Crafts reaction product of Example 5

56 g. (0.5 mol) of 2,3 - dichloropropene - 1 was added dropwise over a period of 35 minutes to a stirred mixture of 70 g. (0.5 mol) $AlCl_3$ and 234 g. (3 mol) benzene at 24–26° C. The hydrogen chloride evolved was absorbed in water. After stirring for 25 minutes longer at 24–26° C. no further evolution of HCl occurred. At this point, titration of the hydrochloric acid collected showed that 0.745 mole of HCl had been evolved. Carbon monoxide was then rapidly bubbled through the stirred reaction mixture at 22–25° C. for a period of 3½ hours and the product worked up by hydrolysis and distillation as described in Example 5. The crude product boiling at 125–195° C./0.1 mm. weighed 40 g. (versus 81.6 g. of Example 5) and solidified on standing. Recrystallization from ethyl alcohol gave 20 g. of pure 2 - methyl - 2 - phenylindanone - 1, M.P. 110.5° C. or 19 percent of theory. This is approximately half as much yield as was obtained in Example 5 by simultaneously reacting the CO with the benzene and the dichloropropene.

EXAMPLE 24

Condensation of benzene with CO and 1,2-dibromo-2-methylbutane 115 g. (0.5 mol) of 1,2 - dibromo - 2 - methylbutane was added dropwise over a period of 3 hours to a vigorously agitated mixture of 70 g. (0.5 mol) $AlCl_3$ and 234 g. (3.0 mol) of benzene maintained at 22–24° C. Carbon monoxide was bubbled rapidly and continuously through the mixture during this addition and for one hour thereafter. The solution was decomposed with ice and the benzene layer distilled under reduced pressure. The crude fraction boiling at 94–117° C./2.5 mm. (28.3 g.) was fractionally redistilled to give a cut boiling at 111–112° C./4.8 mm., $n_D^{26}=1.5370$, and a cut boiling at 112–120° C./4.8 mm., $n_D^{26}=1.5371$ to $$n_D^{26}=1.5405$$

during distillation. Each cut was shaken with a saturated aqueous solution of sodium bisulphite which gave an insoluble aldehyde-bisulphite addition product that was filtered off. The oily layer remaining was again distilled under reduced pressure to give in each case a mixture of two ketones which could not be separated by distillation, but which by nuclear magnetic resonance analysis was found to consist of about 60 percent of 2 - methyl - 2 - ethyl indanone and 40 percent of 2,2 - dimethyl tetralone-1.

For purposes of comparison, it was found that the following aliphatic halides yielded no more than trace amounts of alpha-indanones.

(1) 1,4-dichlorobutane
(2) 1,3-dichloropropane
(3) 1,2,3-trichloropropane
(4) 2,2-dichloropropane
(5) 1,1-dichloropropane
(6) 1,1-dichlorobutane
(7) 1,4-dichlorobutene-2
(8) 1-chlorobutene-3
(9) 1,2-dichlorobutene-3
(10) 2-chloropropene-1
(11) 1,3-dichloropropene-1
(12) 1,2,3-trichloropropene-1
(13) 1,2,2,3-tetrachloropropane
(14) 1,2,3-trichlorobutane For purposes of further comparison, it was found that under similar reaction condition, other Friedel-Crafts type of catalysts such as $FeCl_3$, $SnCl_4$ and $TiCl_4$ were inoperative in the novel process of this invention.

It will be recognized by those skilled in the art that various modifications of the invention, some of which have been referred to above, can be made without departing from the spirit of the invention.

What is desired to be secured by Letters Patent is:

1. The process for preparing beta-disubstituted alpha-indanones which comprises simultaneously reacting carbon monoxide, an aromatic compound selected from the group consisting of benzene, halogenated benzenes, alkyl-substituted benzenes, and mixtures thereof having two reactive positions ortho to each other available for Friedel-Crafts alkylation and acylation, and an aliphatic halide in the presence of an aluminum halide selected from the group consisting of aluminum chloride and aluminum bromide, wherein said aliphatic halide is selected from the group consisting of 1,1,2-trihalogenopropane,
1,2,2-trihalogenopropane,
1,2-dihalogenopropane,
1,2-dihalogeno-2-alkylpropane,
1,2,3-trihalogeno-2-alkylpropane,
1,1,1-trihalogenopropane,
2,2-dihalogenobutane,
1,2-dihalogenobutane,
2,3-dihalogenobutane,
1,3-dihalogenobutane,
2,3-dihalogeno-2,3-dialkylbutane,
2,2,3-trihalogenobutane,
2,3-dihalogeno-2-alkylbutane,
1,2-dihalogeno-2-alkylbutane,
2,2-dihalogeno-3,3-dialkylbutane, halogenated alkenes selected from the group consisting of 3-halogenopropene-1,
1,2-dihalogenopropene-1,
2,3-dihalogenopropene-1,
1-halogenopropene-1,
1-halogeno-2-methylpropene-1,
2-halogeno-3,3-dialkylbutene-1,
3-halogeno-2-alkylpropene-1,
2-halogeno-3-alkylpropene-2,
2-halogeno-3,3,3-trialkylpropene-1,
1,1-dihalogenopropene-1,
2-halogenobutene-1,
2-halogenobutene-2, and mixtures thereof, wherein said halogeno substituent is selected from the group consisting of bromine, chlorine, fluorine, iodine and mixture thereof, and wherein said alkyl contains one to two carbon atoms, and recovering the beta-disubstituted alpha-indanone produced thereby.

2. The process for preparing 2 - methyl - 2 - phenylindanone - 1 which comprises simultaneously reacting 1,2,2 - trichloropropane with carbon monoxide and benzene in the presence of aluminum chloride.

3. The process for preparing 2 - methyl - 2 - phenylindanone - 1 which comprises simultaneously reacting 1,2 - dichloropropane with carbon monoxide and benzene in the presence of aluminum chloride.

4. The process for preparing 2,2 - dimethylindanone-1 which comprises simultaneously reacting 1,2 - dichloro - 2 - methylpropane with carbon monoxide and benzene in the presence of aluminum chloride.

5. The process for preparing 2,2,3,3 - tetramethyl-indanone - 1 which comprises simultaneously reacting 2,3 - dibromo - 2,3 - dimethylbutane with benzene and carbon monoxide in the presence of aluminum chloride.

6. The process for preparing 2,2,3,3 - tetramethyl-indanone - 1 which comprises simultaneously reacting 2-chloro - 3,3 - dimethylbutene - 1 with carbon monoxide and benzene in the presence of aluminum chloride.

7. The process for preparing 2,3 - dimethyl - 2-phenyl-indanone - 1 which comprises simultaneously reacting 1,2,3 - trichloro - 2 - methylpropane with carbon monoxide and benzene in the presence of aluminum chloride.

8. The process for preparing 2,3 - dimethyl - 2-phenyl-indanone - 1 which comprises simultaneously reacting 2,2,3 - trichlorobutane with carbon monoxide and benzene in the presence of aluminum chloride.

9. The process for preparing 2,2,3 - trimethyl-indanone - 1 which comprises simultaneously reacting 2,3-dibromo - 2 - methylbutane with benzene and carbon monoxide in the presence of aluminum chloride.

10. The process for preparing 2 - methyl - 2 - ethylindanone - 1 which comprises simultaneously reacting 1,2 - dibromo - 2 - methylbutane with carbon monoxide and benzene in the presence of aluminum chloride.

References Cited

UNITED STATES PATENTS 2,570,793  10/1951  Gresham et al.
1,754,031  4/1930  Mayer et al. _____ 260—590

OTHER REFERENCES

Olah, Friedel-Crafts and Related Reactions, vol. III, part 2, pages 1298 and 1299, Interscience Publishers, New York, N.Y.

Colonge et al.: Chemical Astracts 42, 3383C (1948).
Campbell et al.: Chemical Astracts 51, 3544C (1957).
Acheson et al.: Chemical Astracts 51, 2689–2692 (1957).

DANIEL D. HORWITZ, Primary Examiner

U.S. Cl. X.R.

204—163; 252—522; 260—566, 652, 654, 658, 668